Feb. 12, 1946.   A. J. NELSON   2,394,801
FLYING TIME INDICATOR
Filed Oct. 3, 1944

A. J. Nelson
INVENTOR.

BY *CAKnowles.*
ATTORNEYS.

Patented Feb. 12, 1946

2,394,801

UNITED STATES PATENT OFFICE 2,394,801

FLYING TIME INDICATOR

Arnold J. Nelson, Washington, D. C.

Application October 3, 1944, Serial No. 556,988

6 Claims. (Cl. 161—15)

This invention relates to an instrument for use by aviators whereby actual flying time can be indicated automatically, thereby eliminating the necessity of estimating the time during which an airplane is in actual flight.

A further object is to provide an instrument of this character wherein the indicating mechanism is actuated by suction due to the flow of air past the moving plane.

Another object is to provide an instrument wherein operation of the working parts is maintained at a predetermined speed, irrespective of the speed of flight.

A still further object is to provide an indicator of this character which is simple and compact in construction and can be installed readily in an airplane.

With the foregoing and other objects in view, which will appear as the description proceeds, the invention consists of certain details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

Figure 1:
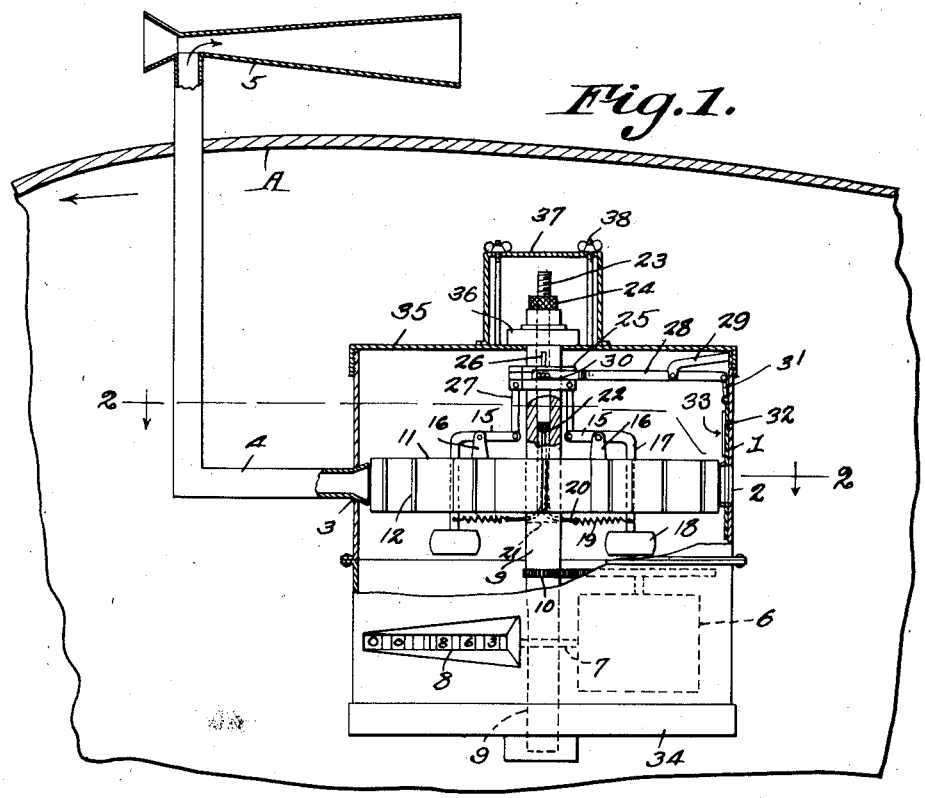
Figure 1 is a view partly in elevation and partly in section of the complete apparatus, parts being broken away.
Figure 2:
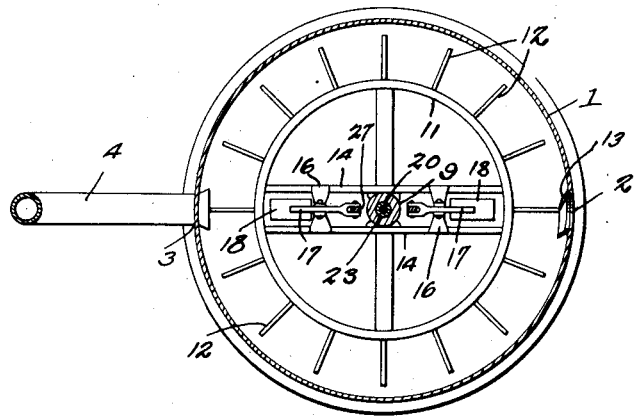
Figure 2 is a section on line 2—2, Figure 1.

Referring to the figures by characters of reference, 1 designates a casing which can be cylindrical, as shown, although obviously it could be made of other shapes. This casing is provided with an air inlet 2 and an air outlet 3, these being diametrically opposed. A tube 4 is extended from the outlet to the restricted portion of a Venturi tube 5, located at a point outside of the airplane A, with its longitudinal axis extended in the direction of flight, as indicated by the arrow in Figure 1.

A clock mechanism has been indicated generally at 6 and includes a shaft 7 to which counter mechanism, indicated generally at 8, is coupled. This counter mechanism is so constructed and assembled as to indicate time in seconds, minutes and hours. The clock mechanism 6 and the indicating portion 8 are all similar to other clock mechanisms of similar types, with the exception of the elimination of the main, or driving, spring. In lieu thereof the clock mechanism 6 is geared to a central shaft 9, as indicated at 10, and this shaft carries a wheel 11 secured to the shaft and located between the inlet 2 and the outlet 3. The wheel is provided with peripheral blades 12 of any preferred construction and arrangement, and these are adapted, during the rotation of the wheel, to pass successively across the inlet 2, and also across the outlet 3. There is provided within the casing 1 at the inlet an air deflecting means 13 which can be in the form of a nozzle so that air rushing through the inlet 2 will be directed laterally against the adjacent blade or blades, so as to cause the wheel 11 to rotate.

Any suitable means can be used for connecting the wheel to the shaft 9 so as to rotate therewith, and one of these means is in the form of a diametrical frame 14 on which are supported levers 15 located at opposite sides of the shaft 9 and extended in opposite directions therefrom. Brackets 16 mounted on the frame 14 can provide bearings for the levers and, as shown, each lever has a depending arm 17 supported to work freely within the frame 14 and having a weight 18 at its lower end.

Coiled springs 19 connect the arms 17 adjacent their lower ends to flexible elements 20 in the form of light wires or parts which are extended into a diametrical opening 21 in shaft 9, which communicates with a central bore 22 in said opening. A screw 23 is adjustably mounted in the upper end of the bore and has its lower end connected to the flexible elements 20. This screw can be locked in adjusted position by a nut 24, or any other suitable means, and obviously by adjusting the screw longitudinally the tension of the spring 19 can be increased or reduced, depending upon the direction of movement of the screw. A collar 25 is slidably mounted on the shaft 9 and rotates therewith, it preferably being held thereto by a key 26. This collar is connected by links 27 to those ends of levers 15 nearest the shaft 9.

A lever 28 is fulcrumed in a bracket 29 extending inwardly from the casing 1, and has a forked end 30 embracing and connected to the collar, so that when the collar is moved upwardly and downwardly along the shaft the lever 28 is swung upwardly and downwardly thereby.

To the lever is connected a link 31 which serves to join the lever to a plate 32, constituting a slide valve positioned to move into and out of position across the inlet 2. It is, of course, to be understood that suitable guides 33 can be utilized for holding the slide valve in proper position relative to the wall of the casing.

A head 34 constitutes a closure for the bottom of the casing 1 and provides an end bearing for the shaft 19. Another head 35 closes the opposite end of the casing and carries a bearing 36 in which the upper portion of the shaft 9 is journaled. The upper, or exposed, end of the shaft and the parts cooperating therewith can be housed within a cap 37 bearing upon the head 35 and held thereto by bolts.

Obviously, the levers 15 with their weighted arms 17, the links 27, the collar 25 cooperate to form a governor which is adapted to rotate with the wheel 11.

The inlet and outlet and other parts are so proportioned that only when an airplane A is in flight will a suction be set up by the flow of air through the Venturi tube 5, sufficient to rotate the wheel 11. When this suction is established, air will be drawn through the inlet 2 to the outlet 3 and during its flow through the casing 1 will engage and actuate the blades 12, thereby causing the wheel 11 to rotate at a predetermined speed. When the speed of the airplane A becomes such as to cause it to leave the ground, the wheel 11 will then be rotating at the predetermined speed and thereafter, as the airplane A continues its flight, the suction set up as a result thereof will cause the wheel to rotate continuously so that motion will be transmitted therefrom through the clock mechanism to the time indicator 8. If, for any reason, the suction should be increased beyond normal, thereby causing an acceleration in the speed of the wheel, the governor will come into action so as to operate lever 28 and shift the valve 32 to partly, or entirely, cut off the flow of air through the inlet 2. Thus, upon completion of any period of elapsed time, the indicator 8 will show the exact flying time which occurred during that period.

By adjusting the screw 23 to increase or reduce the action of the springs 19, the governor can be regulated so as to cause the instrument to maintain any predetermined normal speed of rotation of the wheel 11, thereby to adapt the instrument to different types of airplanes A requiring greater or less speed to lift them from the ground.

What is claimed:

1. An instrument for indicating actual flying time of an airplane, including a clock mechanism for installation in an airplane, an air operated wheel constituting a propelling element for said mechanism, means controlled by the forward movement of the airplane in which the instrument is installed for effecting suction of air against and past the wheel to actuate the wheel and mechanism and means controlled by the wheel operated mechanism for automatically regulating the flow of air to said wheel.

2. An instrument for indicating actual flying time of an airplane, including a clock mechanism for installation in an airplane, an air operated wheel constituting a propelling element for said mechanism, and means controlled by the forward movement of the airplane in which the instrument is installed for effecting suction of air against and past the wheel to actuate the wheel and mechanism, a governor mechanism movable with the wheel, and means controlled by excessive speed of the governor mechanism for reducing the flow of air sucked into the instrument.

3. An instrument for indicating actual flying time of an aircraft, including a casing having an air inlet and an air outlet, a Venturi tube positioned to receive an air current established by the forward travel of an aircraft in which the instrument is installed, a tubular connection between the outlet and the restricted portion of the Venturi tube, an air operated means mounted between the inlet and the outlet for actuation of air flowing from the inlet to the outlet, a clock mechanism, including a time indicator operated by said means, and means controlled by variations in the speed of the air operated means for regulating the flow of air through the inlet.

4. An instrument for indicating actual flying time of an aircraft, including a casing having an air inlet and an outlet, an air actuated element between the inlet and the outlet, clock mechanism operated by said element, a tube leading from the outlet, means controlled by the forward movement of the aircraft while in flight for effecting a suction of air through the tube from the inlet to the outlet to actuate said element, a valve for controlling the flow of air through the inlet, and a governor actuated by said element and connected to the valve.

5. An instrument for indicating actual flying time of an airplane, including a clock mechanism for installation in an airplane, an air operated wheel constituting a propelling element for said mechanism, and means controlled by the forward movement of the airplane in which the instrument is installed for effecting suction of air against and past the wheel to actuate the wheel and mechanism, and a suction controlled centrifugal governor for the wheel, said governor including weighted levers movable with said wheel, a slide valve at the inlet, an operative connection between the governor and the valve, springs positioned to resist movement of the levers from normal position, and means for varying the tension of the springs.

6. The combination with an aircraft of means carried thereby for indicating flying time, said means including a clock mechanism in the aircraft, a Venturi tube outside the aircraft extended in the direction of flight, a casing housing the clock mechanism having an air inlet and an air outlet, a tubular connection between the outlet and the restricted portion of the Venturi tube for the escape by suction of air entering the inlet, and air operated means interposed between the inlet and outlet for actuating the clock mechanism, a centrifugal governor operated by said means, and an inlet controlling valve actuated by the governor.

ARNOLD J. NELSON.